No. 688,968.  Patented Dec. 17, 1901.
J. W. ROWE.
AUTOMATIC VEHICLE BRAKE.
(Application filed Apr. 25, 1901.)
(No Model.)
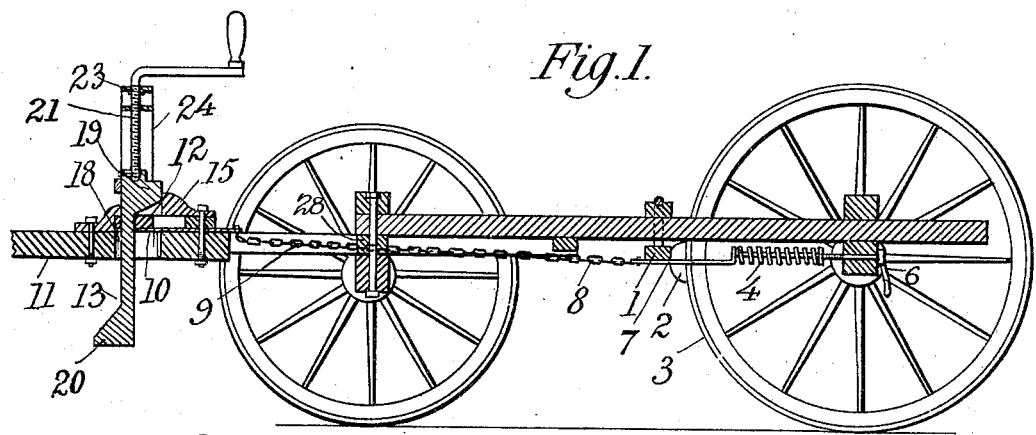
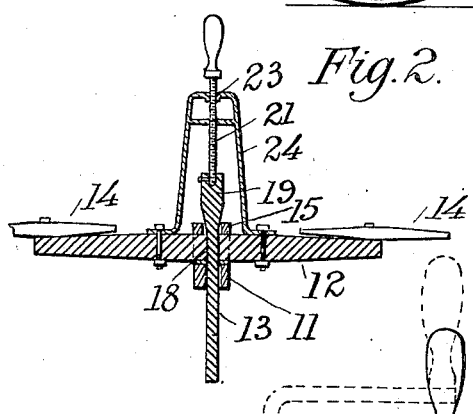
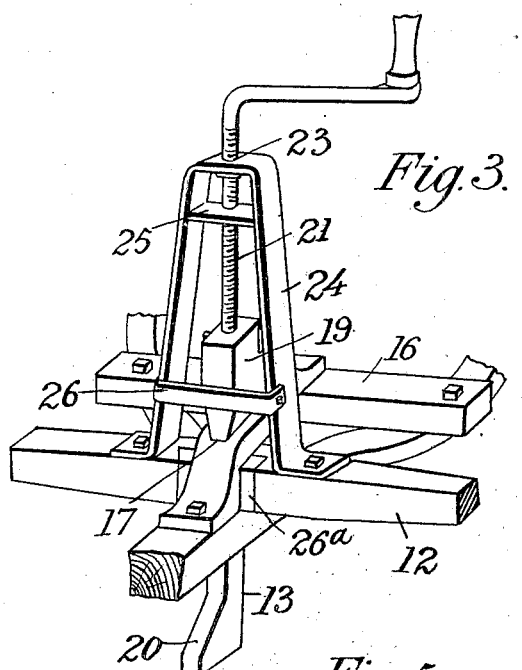
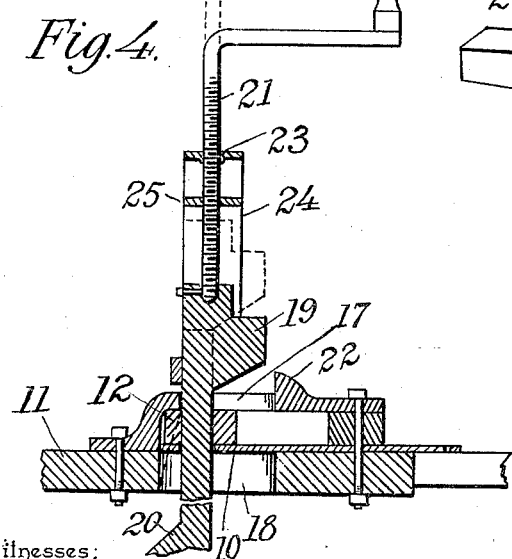
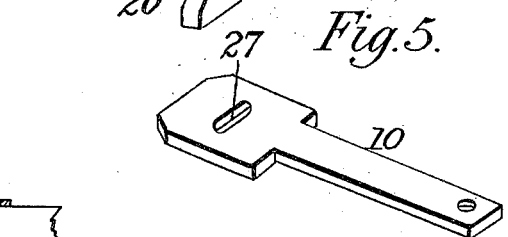
Witnesses:  John W. Rowe, Inventor
by C. A. Snow & Co.
Attorneys

UNITED STATES PATENT OFFICE.

JOHN WESLEY ROWE, OF CENTERTOWN, KENTUCKY.

AUTOMATIC VEHICLE-BRAKE.

SPECIFICATION forming part of Letters Patent No. 688,968, dated December 17, 1901.

Application filed April 25, 1901. Serial No. 57,463. (No model.)

*To all whom it may concern:*

Be it known that I, JOHN WESLEY ROWE, a citizen of the United States, residing at Centertown, in the county of Ohio and State of Kentucky, have invented a new and useful Automatic Vehicle-Brake, of which the following is a specification.

The invention relates to improvements in automatic vehicle-brakes.

The object of the present invention is to improve the construction of automatic vehicle-brakes and to provide a simple, inexpensive, and efficient one adapted to be automatically applied when a vehicle moves forward on the draft-animals in descending a grade and capable of being readily locked into and out of engagement with the rear wheels of a vehicle to prevent the latter from moving forward and to permit the same to be backed freely.

The invention consists in the construction and novel combination and arrangement of parts hereinafter fully described, illustrated in the accompanying drawings, and pointed out in the claims hereto appended.

In the drawings, Figure 1 is a longitudinal sectional view of a running-gear provided with an automatic brake constructed in accordance with this invention. Fig. 2 is a transverse sectional view. Fig. 3 is a detail perspective view illustrating the construction for locking the brake in and out of engagement with the rear wheels. Fig. 4 is an enlarged longitudinal sectional view of the front portion of the running-gear. Fig. 5 is a detail view of the slide.

Like numerals of reference designate corresponding parts in all the figures of the drawings.

1 designates a transverse brake-bar suspended from the rear portion of a running-gear and provided with brake-shoes 2, located in advance of the rear wheels 3 and adapted to engage the same. The brake-shoes are held in engagement with the rear wheels by a coiled spring 4 when there is no forward strain or pull on the whiffletrees; but as soon as the team starts forward the coiled spring will be distended and the brake-shoes will be carried out of engagement with the rear wheels. The rear end of the coiled spring is connected with a rod having a threaded rear portion and extending through the rear axle and provided with a nut 6, having a handle and adapted to be rotated to vary the tension of the spring. The front end of the spring is connected with a plate 7, secured to the brake-bar and extending in advance and in rear of the same and connected in advance of the brake-bar with a chain 8. The chain 8, which is provided at its front end with two branches 9, extends forward to a slide 10, and the branches 9 are located at opposite sides of the front end of the reach, the king-bolt passing through the space between the branches of the chain; but any other suitable means may be employed for connecting the slide with the brake-bar.

The slide 10, which is arranged on the upper face of the tongue or pole 11, is connected with the doubletree 12 by means of a vertically-movable locking-bar 13, and when there is a forward strain or pull on the traces the doubletree is carried forward on the tongue or pole, and the rear wheels are thereby relieved of the brake-shoes. As soon as the traces slacken the spring immediately acts and carries the brake-shoes into engagement with the rear wheels. The doubletree, which is provided with singletrees 14 of the ordinary construction, is capable of a limited backward-and-forward movement, and it is arranged within a guide or keeper 15, extending longitudinally of the rear portion of the tongue or pole and secured at its front end to the same and at its rear end to a cross-bar 16. The front end of the guide or keeper is enlarged to form a depending lug which fits against the tongue or pole and which offsets its upper body portion from the same. The rear end of the guide or keeper is secured to the upper face of the said cross-bar 16. The cross-bar 16, which is secured to the front hounds in rear of the doubletree, braces the said hounds and also forms a stop for the doubletree to enable either of a pair of draft-animals to relieve the vehicle of the brake should the other draft-animal become balky. The guide or keeper is provided with a longitudinal slot 17, which receives the vertically-movable locking-bar 13 and which permits the same to move backward and forward with the slide. The locking-bar also extends through a slot 18 of the tongue or pole, and it is provided with upper and lower lugs 19 and 20, extending backward and forward and adapted to be carried by a screw 21 into engagement with a lug 22 of the guide or keeper or in engagement with the tongue or pole. The lower edge of the upper lug 19 is beveled and the upper edge of the lower lug is beveled, and by this construction upper and lower wedges are provided to enable the lugs to be drawn or forced into engagement with the tongue or the lug 22 by the action of the screw. The lug 19, which extends rearward from the locking-bar, is adapted to engage the lug 22 of the guide or keeper at the back of the slot when the slide is at the limit of its forward movement and while the brake-shoes are out of engagement with the hind wheels. Such engagement will prevent the spring from drawing the brake-bar rearward when the traces are slackened, and the brake is thus locked out of engagement when it is desired to back the vehicle. The lower lug 20 of the locking-bar is adapted to engage the tongue by being drawn into the slot 18 thereof while the brake-shoes are in engagement with the rear wheels, and this engagement will prevent the draft-animals from drawing the slide forward and the brake-shoes cannot be thrown off the rear wheels when the locking-bar is so arranged. The locking-bar may be readily engaged with the back of the guide or keeper while the slide is at the limit of its forward movement and when there is a strain or forward pull on the traces, but the screw will enable the wedge-shaped upper lug to be forced downward into such engagement. Also the screw will enable the lower lug to be drawn upward into engagement with the tongue or pole.

The screw, which is swiveled at its lower end to the upper end of the locking-bar, engages a threaded opening 23 of a brace 24, mounted upon the doubletree and supported by upper and lower cross-pieces 25 and 26. The upper end of the screw is preferably provided with a crank-handle to enable it to be readily rotated to raise and lower the locking-bar. The doubletree is provided with a removable dovetailed block 26ª, which permits the locking-bar to be removed from and replaced in the opening of the doubletree. The central portion of the locking-bar is preferably rectangular in cross-section, and the opening of the doubletree is of a similar shape to conform to the configuration of the intermediate portion of the locking-bar to prevent the latter from rotating when the screw is operated. The slide is provided with a transverse opening 27 to permit the parts to be assembled; but it may be arranged longitudinally, as the spring will draw the slide rearwardly when the doubletree is forced backward by the lower wedge-shaped lug. The coupling-pole is preferably supported by a sleeve 28, arranged on the king-bolt and interposed between the front axle and the pole or reach, and the branches of the chain 8 are arranged at opposite sides of the sleeve.

It will be seen that the automatic vehicle-brake is simple and comparatively inexpensive in construction, that the brake-shoes are carried into engagement with the rear wheels as soon as the traces slacken, and that they may be readily locked in and out of such engagement.

What I claim is—

1. In a vehicle-brake, the combination of a running-gear, a brake-bar having brake-shoes, a slide, connections between the slide and the brake-bar, and a vertically-movable locking-bar provided with upper and lower reversely-disposed lugs or projections arranged to lock the slide at the limit of its backward-and-forward movements, substantially as described.

2. In a vehicle-brake, the combination with a running-gear having a doubletree capable of backward-and-forward movement, brake-shoes, means for supporting the same, connections between the brake-shoes and the doubletree, and a vertically-movable locking-bar provided with forwardly and rearwardly extending portions adapted to lock the doubletree at the forward and rearward limit of its movement, substantially as and for the purpose described.

3. In a vehicle-brake, the combination with a running-gear, of a doubletree having a limited backward-and-forward movement, and a vertically-movable locking device provided with oppositely-disposed portions arranged to lock the doubletree at the limit of its backward-and-forward movement, substantially as described.

4. In a vehicle-brake, the combination of a tongue having a slot, a keeper arranged above the tongue and provided with a corresponding slot, a doubletree arranged within the keeper, and the vertically-movable locking-bar connected with the doubletree and provided with reversely-disposed lugs or projections arranged to engage the keeper and the tongue, substantially as and for the purpose described.

5. In a vehicle-brake, the combination with a keeper and a tongue, of a doubletree arranged within the keeper and having a limited backward-and-forward movement, and a vertically-movable locking-bar provided with reversely-arranged portions adapted to engage the tongue and the keeper to lock the doubletree at the limit of its backward-and-forward movement, substantially as described.

6. In a vehicle-brake, the combination of a tongue having a slot, a keeper mounted on the tongue and having a slot corresponding with the said slot, a doubletree arranged within the keeper, a vertically-movable locking-bar provided with oppositely-disposed wedge-shaped lugs located above and below the doubletree, and a screw connected with and adapted to raise and lower the locking-bar, substantially as described.

7. In a vehicle-brake, the combination with a running-gear having a slotted tongue, a transverse brace mounted on the front hounds, a keeper secured to the brace and to the tongue, and having a slot, a doubletree arranged in the keeper, a vertically-movable locking-bar connected with the doubletree and passing through the tongue and the keeper, a support or brace arched over the keeper and provided with a threaded opening, and a screw passing through the threaded opening and connected with the locking-bar, substantially as described.

In testimony that I claim the foregoing as my own I have hereto affixed my signature in the presence of two witnesses.

JOHN WESLEY ROWE.

Witnesses:
J. A. RENEER,
J. T. BENNETT.